United States Patent [19]
Byrnes et al.

[11] Patent Number: 5,092,738
[45] Date of Patent: Mar. 3, 1992

[54] FLEXBEAM HELICOPTER ROTOR WITH IMPROVED SNUBBER-VIBRATION DAMPER BETWEEN THE TORQUE TUBE AND THE FLEXIBLE SPAR MEMBER

[75] Inventors: Francis E. Byrnes, White Plains, N.Y.; Frank P. D'Anna, Seymour, Conn.

[73] Assignee: United Technologies Corporation, Hartford, Conn.

[21] Appl. No.: 505,865

[22] Filed: Apr. 6, 1990

[51] Int. Cl.$^5$ ............................................. B64C 27/35
[52] U.S. Cl. .................................. 416/134 A; 416/140; 416/141
[58] Field of Search ............... 416/131, 134 A, 140 R, 416/140 A, 141; 403/348, 407.1; 244/17.11, 17.27

[56] References Cited

U.S. PATENT DOCUMENTS

| | | | |
|---|---|---|---|
| 3,932,059 | 1/1976 | Rybicki | 416/141 |
| 4,087,203 | 5/1978 | Ferris | 416/134 A |
| 4,093,400 | 6/1978 | Rybicki | 416/134 A |
| 4,222,709 | 9/1980 | Mouille | 416/134 A |
| 4,244,677 | 1/1981 | Noehren et al. | 416/134 A |
| 4,273,511 | 6/1981 | Mouille et al. | 416/134 A |
| 4,427,340 | 1/1984 | Metzger et al. | 416/134 A |
| 4,690,615 | 9/1987 | Kuntz-Fechner et al. | 416/134 A |
| 4,690,616 | 9/1987 | Hahn et al. | 416/134 A |
| 4,778,343 | 10/1988 | Hahn et al. | 416/134 A |
| 4,893,988 | 1/1990 | Sato | 416/140 |
| 4,895,354 | 1/1990 | Byrnes | 416/134 A |

FOREIGN PATENT DOCUMENTS

335673 10/1989 European Pat. Off. ............ 403/348

Primary Examiner—Edward K. Look
Assistant Examiner—James A. Larson

[57] ABSTRACT

A flexbeam helicopter rotor having an improved snubber-vibration damper for positioning the flexbeam spar relative to the torque tube, wherein the snubber-damper is an elastomeric bearing having a spherical and a flat portion, and whose laminates are continuous, selectively preloaded and of selected material to provide increased fatigue life, size reduction, reduced laminate stress concentration, and reduced critical design stress in the snubber-vibration damper.

8 Claims, 4 Drawing Sheets

FLEXBEAM HELICOPTER ROTOR WITH IMPROVED SNUBBER-VIBRATION DAMPER BETWEEN THE TORQUE TUBE AND THE FLEXIBLE SPAR MEMBER

DESCRIPTION

1. Technical Field

This invention relates to an elastomeric snubber and vibration damper positioned between the flexible spar member and the torque tube of a flexbeam helicopter rotor and, more particularly, to such a snubber-vibration damper in which the laminates are continuous, in which the laminates are maintained in compression throughout the full operating range, and in which the elastomer laminates have a high loss factor to accommodate lead-lag motion between the torque tube and the flexible spar to achieve increased load carrying capability, to produce snubber-vibration damper size reduction, and to perform a vibration damping function.

2. Background of the Invention

In flexbeam helicopter rotors, whether of the even bladed crossbeam variety shown in U.S. Pat. No. 4,244,677, or of the odd numbered blade variety disclosed herein, it is necessary to provide positioning and load carrying means between the flexible spar and its enveloping torque tube to perform the function of positioning the spar for pitch change and flapping motion about the intersection of the pitch change and flapping axes, for imparting pitch change control and other loads therebetween, and for accommodating relative motion therebetween. The snubber-vibration damper 52 is needed to position the torque tube with respect to the flexbeam as the blade goes through its various motions including pitch change, flapping and lead-lag, otherwise there would be substantial relative motion between the torque tube and the flexbeam and this would result in a loss of pitch change control.

It is known in the prior art to use elastomeric bearings to perform this function by positioning such bearings as a "snubber" between the flexbeam spar and the torque tube, and to preload the elastomeric bearings so that the elastomer laminates thereof remain in compression throughout the full load range imposed upon the bearing since elastomeric material is prone to failure under tension. In the known prior art, such as the aforementioned U.S. Pat. No. 4,244,677, the precompression of the elastomeric bearing has required apertured laminates in the elastomeric bearing through which a preload bolt extends. Such an aperture produces significant stress concentration in the elastomer laminates of the elastomeric bearing, and therefore induces fatigue failure of the elastomer.

These prior art snubbers were fabricated with natural rubber as the elastomer laminate and, while this was adequate for small rotors and helicopter tail rotors, in helicopter main rotor environments, if rubber were used as the elastomer laminates, the size of the elastomeric bearing necessary to carry the loads and accommodate the motions involved in flight could not be contained in a reasonable envelope and would therefore increase the size of the torque tube, and this increased sized torque tube would increase helicopter weight and drag.

The prior art snubbers with rubber laminates are also incapable of producing the vibration damping which is required of such a snubber-vibration damper mechanism for a helicopter main rotor, where the requirement is for an elastomer laminate having a high loss factor, rather than the low loss factor of natural rubber.

DISCLOSURE OF THE INVENTION

Therefore, it is an object of this invention to provide a snubber-vibration damper mechanism between the flexbeam spar and the torque tube of a helicopter flexbeam rotor utilizing an elastomeric bearing in which the elastomer laminates are continuous, i.e., wherein both the elastomer and non-extensible material laminates are solid and do not have apertures extending therethrough.

It is a further object of this invention to teach such a snubber in which the elastomer laminates of the elastomeric bearing are made of material having a high loss factor so as to be able to perform the function of accommodating required lead-lag relative motion between the spar and the torque tube, so as to be able to damp rotor vibrations, and so as to be able to transmit the pitch control loads and other forces generated during flight between the torque tube and the spar, all while positioning the flexible spar member relative to the torque tube.

It is a further object of this invention to teach such an elastomeric bearing type snubber-damper having improved fatigue life over the prior art snubbers, which is serviceable in the field, and which reduces the critical design strain and the vibratory compression strain in the elastomer by a factor of about 2.3 over the prior art snubbers.

It is still a further object of the present invention to teach such a snubber-vibration damper of the elastomeric bearing variety in which the inner laminates of the elastomeric bearing are spherical in shape so as to position the flexbeam spar from the torque tube about the intersection of the blade pitch change and flapping axes, and wherein the outer laminates are flat so as to accommodate lead-lag motion between the spar and the torque tube which the spherical inner laminates can not tolerate and to perform a vibration damping function, and to permit a degree of relative radial motion between the torque tube and the flexbeam spar.

It is a feature of this invention that the inner end of the snubber-vibration damper is connected through a quick connect/disconnect joint to the flexible spar member.

It is still a further object of the present invention to teach such a snubber-damper in which the outer laminates extend through an aperture in the torque tube a selected distance so that the laminates can be brought into a compressive load as the preload plate to which the outer elastomer laminate is bonded, is depressed against and connected to the torque tube so as to place the elastomeric bearing in a selected preload condition. The distance which the laminates extend through the torque tube aperture and, hence, the distance the preload plate depresses the laminates is selected so that the snubber-damper can withstand all flight and pitch change loads imposed thereon without coming out of compression and into a destructive tension loading.

Other objects, features and advantages of the invention will become apparent in light of the following description thereof.

BEST MODE FOR CARRYING OUT THE INVENTION

Figure 1:
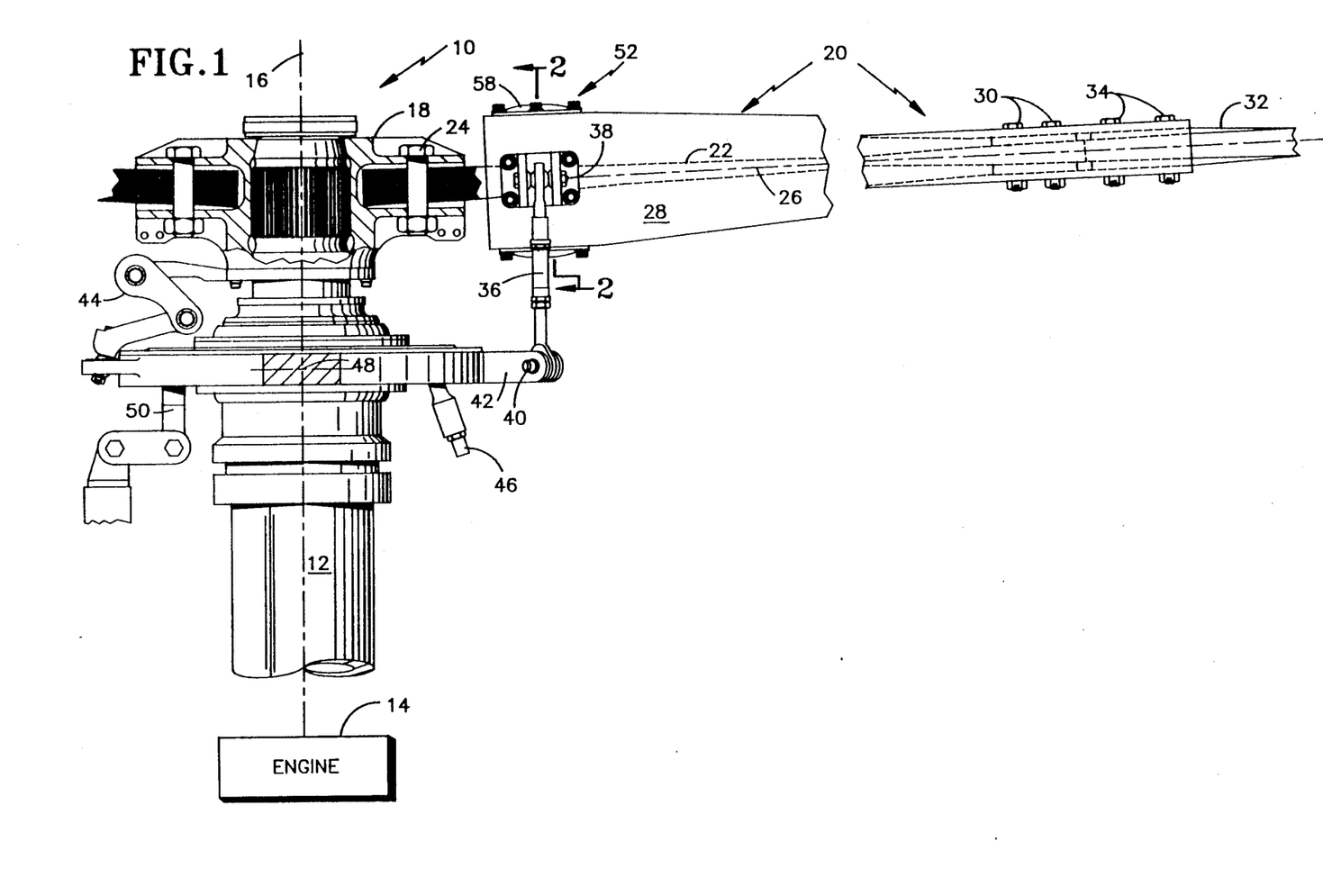
FIG. 1 is a partial showing, partly broken away, of a helicopter flexbeam rotor to show my invention in its environment.

FIG. 1 shows the pertinent portions of helicopter flexbeam rotor 10 which includes drive shaft 12 which is driven in conventional fashion by an engine 14, probably through reduction gearing (not shown), for rotation about axis of rotation 16. Rotor hub 18 is mounted on drive shaft 12 for rotation therewith about axis 16 and supports therefrom a series of blade assemblies one of which is shown at 20. Blade assembly 20 includes flexbeam spar 22 integrally connected to rotor hub 18 by connecting bolt 24 so as to be flexible about pitch change axis 26. Torque tube 28 envelopes flex spar 22 in spaced relation thereto, and is connected thereto at its radially outer end by connecting bolts 30, and is articulately connected thereto through the snubber-vibration damper mechanism which is the subject matter of this invention. Torque tube 28 is connected to aerodynamic blade member 32 by conventional connecting bolts 34 so that, as drive shaft 12 rotates about axis of rotation 16, flexbeam 22, torque tube 28 and blade portion 32 rotate therewith.

While FIG. 1 shows a flexbeam spar member 22 supporting but a single blade member 32, this is because the particular construction illustrated is part of a helicopter rotor system having an odd number of blades. If the helicopter had an even number of blades, a single flexbeam member 22 could be utilized to support diametrically opposite blade members.

Figures 2, 3:
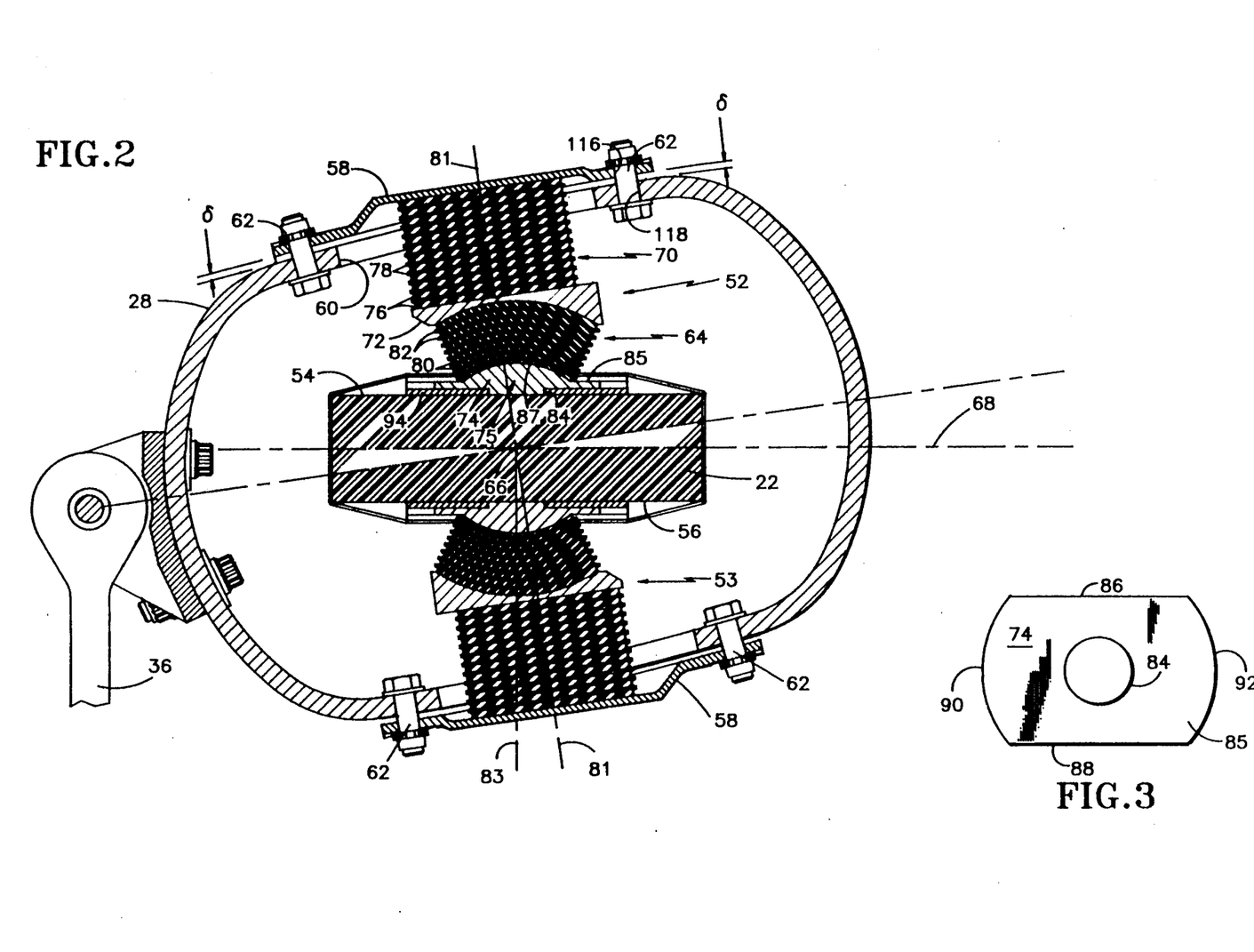
FIG. 2 is a view taken along line 2—2 of FIG. 1 to illustrate my improved snubber-vibration damper mechanism extending between the helicopter blade flexbeam spar and the torque tube.
FIG. 3 is a view of the inner end of my snubber-vibration damper to illustrate a portion of the quick connect/disconnect mechanism between the snubber-vibration damper and the flexbeam spar.

Pitch change loads are imparted to blade assembly 20 by pitch control rods 36 which are pivotally connected at one end to the outer periphery of torque tube 28 by conventional connecting means 38. Pitch control rod 36 is pivotally connected to the swashplate 42 through connecting bolt 40. Swashplate member 42 is connected by scissor arrangement 44 to rotor hub 18 so as to rotate therewith. Swashplate 42 receives pitch control inputs from control rod members 46 to cause swashplate 42 to tilt about point 48. In this fashion, pitch control commands imparted by swashplate control rods 46 cause tilting of swashplate 42 so as to impart pitch change loads to torque tube 28 through pitch control rod 36 resulting in pitch change motion of torque tube 28 about pitch change axis 26. This pitch change load will be imparted to flexbeam 22 through the snubber-vibration damper mechanism which is the subject matter of this invention, and which is shown in FIG. 2. Inputs from control rods 50 cause swashplate 42 to translate along axis of rotation 16 to similarly impart pitch control loads to torque tube 28 and, hence, blade assembly 20. When swashplate 42 translates along axis 16, it imparts collective pitch change to blade assemblies 20, and when it tilts about point 48, it imparts cyclic pitch change to blades such as 20.

As shown in FIG. 2, flexbeam 22 is connected to the radially inner end of torque tube 28 through elastomeric snubber and vibration damper member 52. It will be noted that flexbeam 22 is fabricated so as to be of rectangular cross section and to have a top flat surface 54 and a bottom flat surface 56 to which snubber-vibration damper units 52 and 53 are connected, respectively, in a fashion to be described hereinafter. Flexbeam 22 is capable of carrying high tension loads, and is flexible about its longitudinal axis, but resistant to lateral flexing motions because it is preferably fabricated of high strength fiber members extending in parallel relationship radially therealong and bonded together so as to form a flexible spar with high tensile strength and shaped be rectangular in cross-section and present flat upper and lower surfaces. Since the construction of snubber-vibration damper units 52 and 53 are identical, unit 52 only will be described herein. The outer end of snubber-vibration damper 52 is bonded to preload plate member 58, and extends through aperture 60 in torque tube 28 a selected distance to be discussed hereinafter so that after the inner end of snubber-vibration damper unit 52 is connected to flexbeam 22 in assembly, as preload plate 58 is depressed and brought into bolted connection with torque tube 28 through bolt members 62, snubber-vibration damper 52 is placed in a selected preload condition to be described in greater detail hereafter.

Snubber-vibration damper 52, which is preferably circular in cross-section, comprises an inner portion 64 which is a spherical elastomeric bearing which is concentric about and supports flexbeam 22 in position about the intersection 66 of pitch change axis 26 and flapping axis 68. The outer portion 70 of snubber-vibration damper 52 is a flat elastomeric bearing. Both the inner portion 64 and the outer portion 70 consists of alternate elastomer and non-extensible material laminates such that the end elastomer laminates of flat elastomeric bearing 70 are bonded to preload plate 58 and race member 72, respectively, and the end elastomer laminates of spherical portion 64 are bonded to race member 72 and inner support member 74, respectively. This bonding takes place during manufacture of the snubber-damper 52. Member 74 forms part of quick connect-disconnect joint 75 between snubber-damper 52 and spar 22.

Elastomeric bearings per se are well known and are described in U.S. Pat. No. 3,932,059 to Rybicki (1976), in my U.S. Pat. No. 4,895,374 (1990), and in the LASTOFLEX, Bearing Design Guide, Report No. PE 76-006, published on Jan. 30, 1976 by Lord Kinematics of Erie, Pa.

In viewing FIG. 2, it will be seen that as pitch change control rod 36 imparts pitch change loads to torque tube 28, it causes torque tube 28 and, hence, flexbeam 22, due to the interaction therebetween of snubber-vibration damper 52, to move about pitch change axis 26. Spherical elastomeric bearing 64 inner portion acts to permit this pitch change motion of torque tube 28 and flexbeam 22 about pitch change axis 26. Spherical bearing 64 also accommodates bending motion between torque tube 28 and spar 22 while outer portion 70 acts not only to impart pitch change loads to inner portion 64 from torque tube 28 but also to serve as a vibration damper with respect to rotor vibrations which produce relative lead-lag motion between the torque tube 28 and the flexbeam 22.

The reason that both the central portion 64 spherical elastomeric bearing and the outer portion 70 flat laminate elastomeric bearing are necessary is that the spherical, inner portion 64 of snubber-damper 52 accommodated relative pitch motion between the spar 22 and the torque tube 28, while the flat, outer portion 70 accommodates relative lead-lag motion between the spar 22 and the torque tube 28.

While in the arrangement shown in FIG. 2 and elsewhere the inner spherical elastomeric bearing and the outer flat elastomeric bearing are shown out of alignment, this was done merely to accommodate twist differential between the torque tube and flexbeam of the particular rotor under development. The inner portion 64 and the outer portion 70 could well be in alignment.

Viewing FIG. 2, it will be noted therefrom that outer flat elastomeric bearing 70 consists of a series of alternating flat continuous elastomer and non-extensible material laminates 76 and 78, with the outermost and innermost elastomer laminate 76 bonded during the bearing manufacturing process to preload plate 58 and race 72, respectively. Similarly, in the spherical elastomeric inner portion 64, we note that there are spherically shaped continuous and alternately positioned elastomeric laminates 80, and non-extensible material laminates 82, and with the outer and innermost elastomeric laminates 80 bonded to race 72 and inner connecting member 74, respectively, during the bearing fabrication process. Laminates 76 and 78 are preferably circular in cross-section and concentric about axis 81, while spherical laminates 80 and 82 are also circular in cross-section and concentric about axis 83. Each elastomer laminate 76 and 80 is bonded to each of its adjacent non-extensible laminates 78 and 82 during the manufacturing process.

It will be noted that inner connecting member or inner race 74 is shaped to have a flat portion 85 from which a spherical portion 87 projects and which is shaped to matingly engage and be bonded to the innermost elastomer laminate 80 of snubber-damper member 52. A cylindrical knob 84 projects inwardly from flat portion 85 in a direction opposite to the spherical projection 87. Inner race or connecting member 74 is shown in greater particularity in FIG. 3, which is a bottom view of member 74, and it will be noted that member 74 has spaced flat side surfaces 86 and 88 and circular or otherwise curved end surfaces 90 and 92 with greater spacing therebetween than the flat surfaces.

Figure 4:
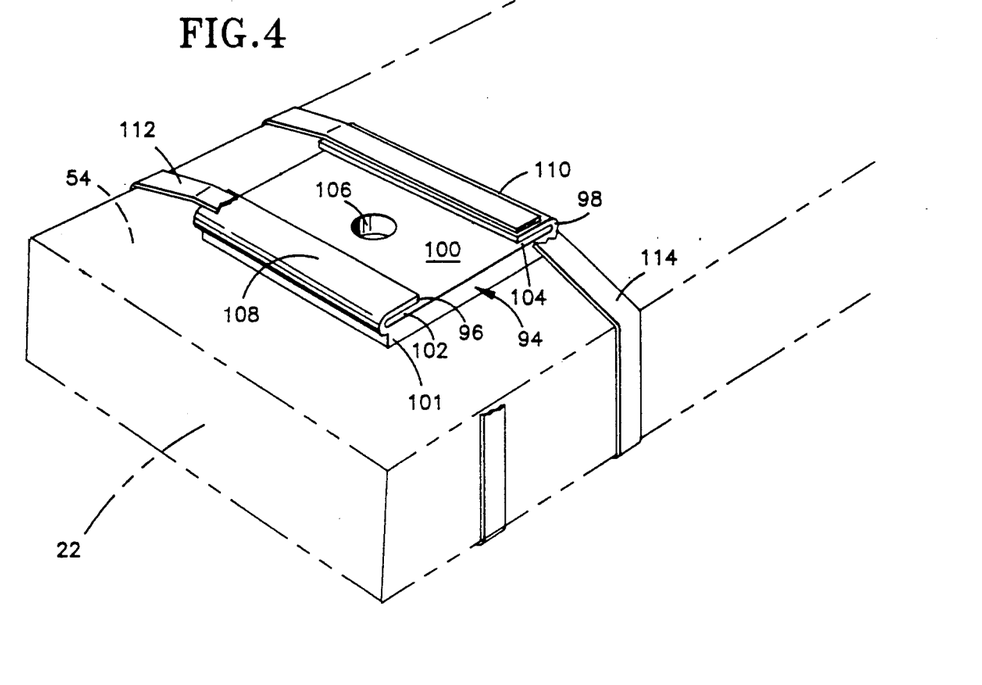
FIG. 4 is a prospective showing of a portion of the flexbeam spar with one of the two retainer mechanisms in position, which retainer mechanism cooperates with the FIG. 3 mechanism to define the quick connect/disconnect mechanism between the spar and the snubber-damper.

Member 74 cooperates with retainer member 94, shown in FIG. 4, to form a quick connect/disconnect joint 75 between the inner end of snubber-vibration damper member 52 and flexbeam 22. Retainer 94 is bonded to the top surface 54 of flexbeam 22, and a similar retainer 94, not shown, is bonded in alignment therewith to the bottom surface 56 of flexbeam 22.

Fixture member 94 has spaced channel flanges 96 and 98 extending in parallel relationship on opposite sides thereof and in spaced relationship to surface 100 of flat portion of 101 of retainer 94 so as to form parallel, spaced channels 102 and 104 therebetween. Retainer 94 has cylindrical aperture 106 therein which is sized to matingly receive knob 84 of inner race member 74. Composite wrap members 112 and 114 perform the function of preventing retainer member 94 from moving with respect to spar 22 as they extend across top surfaces 108 and 110 of flanges 96 and 98 of retainer members 94 as positioned on the top and bottom sides of flexbeam 22 and further extend around flexbeam 22.

With retainer member 94 so positioned, during assembly of snubber-vibration damper 52, member 52 is lowered through torque tube aperture 60 toward flexbeam 22. Race or connector 74 is positioned so that its knob 84 matingly engages aperture 106 of retainer 94 and with flat surfaces 86 and 88 extending parallel to flanges 96 and 98, whereupon the snubber-vibration damper 52 is rotated 90 degrees so that the circular surfaces 90 and 92 of member 74 are engaged in channels 102 and 104. The preload which is eventually applied to snubber-vibration damper 52 assists in so retaining member 74 in position with respect to fixed retainer 94. It will therefore be seen that members 74 and 94 coact to form a quick connect/disconnect joint 75 between the inner end of snubber-vibration damper 5 and flexbeam 22.

It is important teaching of this invention that the laminates of snubber-vibration damper 52 be held in compression throughout the full operating range of the helicopter since elastomeric bearings cannot withstand tension loading. Accordingly, as shown in FIG. 2, snubber-damper 52 is fabricated to be of a selected height so that with inner end connector 74 of unit 52 connected to retainer 94 on spar 22, preload plate 58 is positioned a selected distance d outboard of torque tube 28. When preload plate 58 is depressed by bolt 62 action through a circular array of aligned apertures 116 and 118 in preload plate 58 and torque tube 28, respectively, so as to connect preload plate 58 to torque tube 28, the resulting preload deflection d of snubber-vibration damper 52 places sufficient preload on unit 52 to place the laminates of member 52 in compression loading throughout the full load operating range which will be imposed thereon, so as to thereby avoid placing these laminates in potentially destructive tension loading during operation.

To explain how the amount of compression preloading which it is necessary to impose upon members 52, and hence, the degree of motion d through which preload plate 58 must be depressed to achieve this degree of preloading, reference will now be made to FIG. 5.

Figure 5:
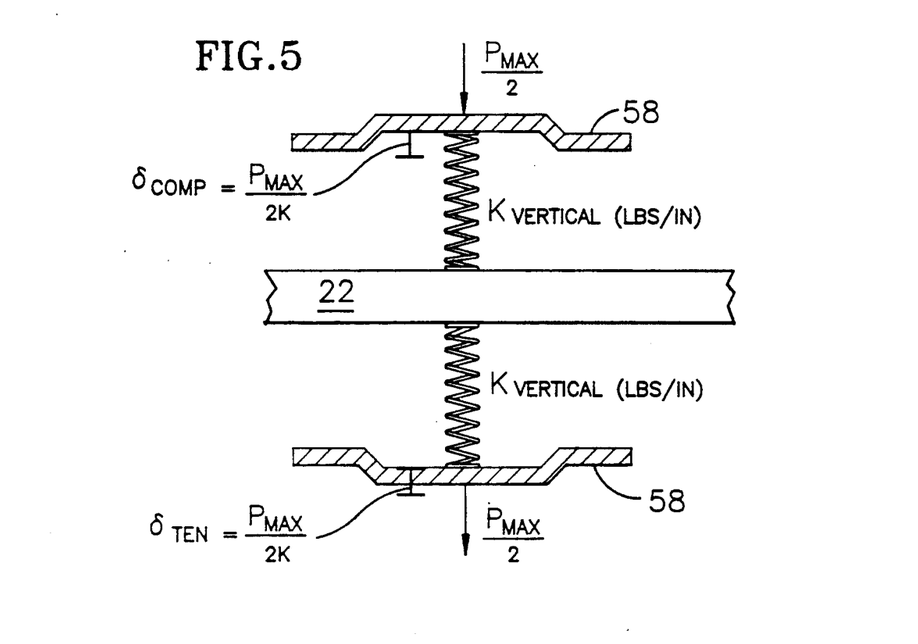
FIG. 5 is a schematic representation of the loads imposed upon my snubber-vibration damper mechanism to illustrate the degree to which it must be compressed for appropriate preloading.

In FIG. 5, preload plates 58 of snubber-damper members 52 and 53 are shown on opposite sides of flexbeam 22 and snubber-vibration damper members 52 and 53 are represented in the vertical plane as two springs connecting the flexbeam 22 to preload plates 58, which are connectable to torque tube 28. In this configuration, the maximum load to which the snubber-vibration damper 52 will be subjected is represented as load $P_{max}$, and the vertical spring rate of snubber-vibration dampers 52 and 53 is represented as K in pounds per inch. As depicted in FIG. 5, during maximum pitch change loading of torque tube 28 by pitch control rod 36, which is the maximum anticipated load members 52 and 53 will experience, the top preload plate 58 will experience a compressive load of $P_{max}/2$, whereas the bottom preload plate 58 will experience a tension load of $P_{max}/2$. To keep the snubber-vibration damper 52 in compression throughout the full operating range, including at maximum anticipated load $P_{max}$, each snubber is preloaded in compression by depression of preload plates 58, and hence members 52 and 53, a distance equal to $P_{max}/2K$, as preload plates 58 are bolted to torque tube 28 by the action of bolts 62.

It is further an important teaching of this invention that both the elastomer laminates and the non-extensible material laminates of both flat elastomeric bearing outer portion 70 and the spherical elastomeric inner portion 64 be continuous, that is, that they not have apertures extending therethrough. The importance and advantage of this teaching can best be understood by viewing FIGS. 6A, bB and 7A, 7B and 8.

Figure 6A:
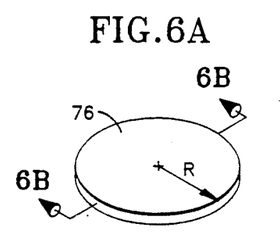
FIG. 6A is a perspective showing of one of my continuous elastomer laminates.

In FIG. 6A, we see one of my continuous laminates, such as 76, which could be either an elastomer laminate as depicted, or a non-extensible material laminate 78, and which is circular in shape and of 1.5 inches radius and is 0.10 inches thick. The prior art laminate of the type utilized in prior art U.S. Pat. No. 4,244,677 is shown in FIG. 7A. This is also a laminate which is 1.5 inches in radius and 0.10 inches thick, but which has a 0.50 inch diameter hole or aperture 116 in the center thereof. It will be noted that FIGS. 6B and 7B are cross sectional showings through the laminates of FIG. 6A and 7A, respectively, and each is depicted as having a load represented as P imposed thereagainst.

Figure 6B:
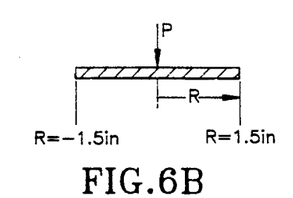
FIG. 6B is a showing along line 6B—6B of FIG. 6A.
Figure 7A:
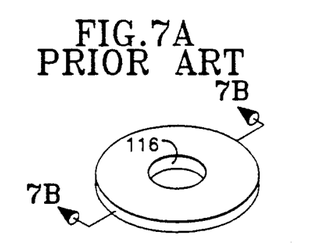
FIG. 7A is a perspective showing of a prior art apertured elastomeric laminate.
Figure 7B:
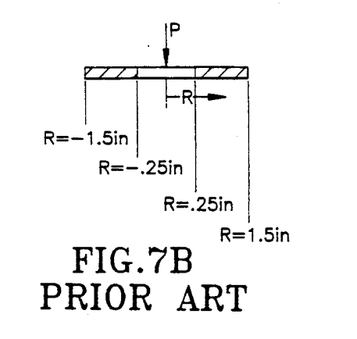
FIG. 7B is a showing taken along line 7B—7B of FIG. 7A.
Figure 8:
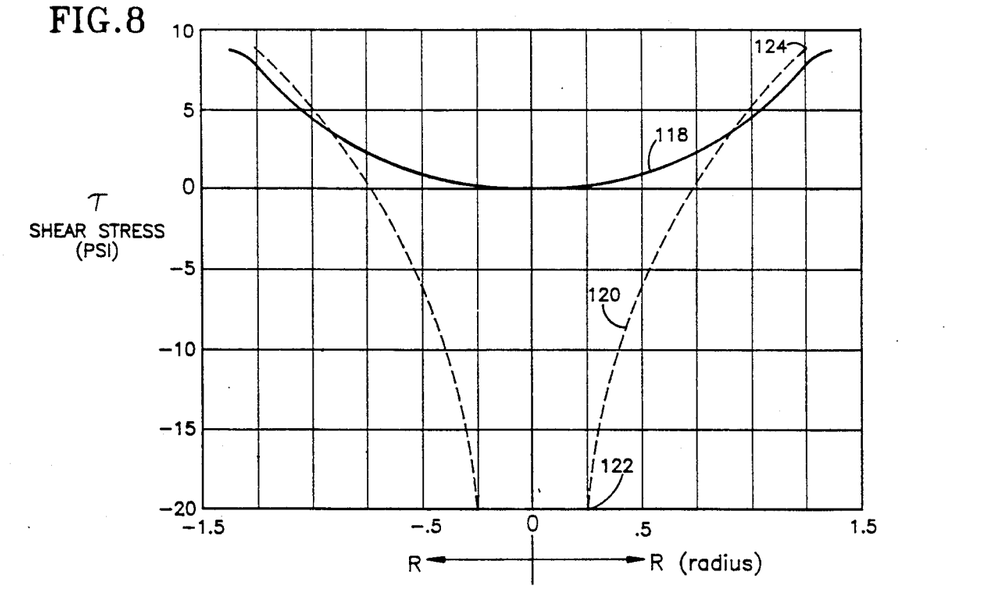
FIG. 8 is a graph plotting shear stress against the radial dimension of my continuous elastomer laminate and the prior art apertured elastomer laminate to illustrate the drastic difference in shear stress distribution therebetween.

Now referring to FIG. 8, we see a graph illustrating the shear stress distribution along the FIG. 6A-B solid elastomer laminate construction shown along line 118, as opposed to that for the apertured FIG. 7A-B construction shown along dotted line 120. It will be noted that there is a substantial differential in shear stress in pounds per square inch between the inner diameter of FIG. 7A-B apertured laminate which stress is depicted at 122, and the outer diameter, which stress is depicted at 124. Contrary to this, there is considerably diminished shear stress differential experience by the continuous FIG. 6A-B laminate as shown along line 118. FIG. 8 shows that the inner diameter of the apertured laminate is strained double the amount of the outer diameter. The shear stress differential in the apertured laminate of FIG. 7A-B is such that the apertured laminate has substantially less service life than the continuous laminate. To increase the service life of the apertured laminate, it would be necessary to half the thickness of each elastomer laminate to 0.05 inches and double the number of both elastomer and non-extensible laminates, thereby increasing the size envelope of snubber-vibration damper 52, as well as the weight thereof. This demonstrates that my improved snubber-vibration damper 52 with continuous laminates provides both a size and a weight saving over the prior art apertured damper when used in this snubber-vibration damper unit 52.

It will therefore be seen that by providing a snubber-damper 52 with a preload mechanism which does not require apertured laminates, the fatigue life of the snubber-vibration damper 52 has been substantially increased. My construction also allows for a more compact and lighter snubber-vibration damper 52 since fewer reinforcement shims are required in the elastomeric laminates.

It can be mathematically demonstrated that the critical design strain, conventionally identified as GAMMA, in the snubber-vibration damper unit 52 for a typical main rotor application is 19.625 where the laminates include apertures, and 8.501 where the laminates are continuous and do not include apertures. This demonstrates that my construction effectively reduces the vibratory compression strains in the elastomer by a factor of 2.3. The mathematics to produce these figures can be found in "Engineering Design With Natural Rubber" by P. B. Lindley, published by the Malaysian Rubber Research Association.

Another improvement in my snubber-vibration damper 52 is that while the prior art's snubbers used natural rubber for the elastomeric laminates, my flat elastomer laminates 76 of outer portion 70 of snubber-damper 52 are made by either polybutane or silicone, while the spherical elastomer laminates 80 of inner portion 64 of snubber-damper 52 are made of natural rubber. Natural rubber could be used in the flat laminates prior art snubber because that elastomer was intended for use in and is depicted in U.S. Pat. No. 4,244,677 in a small helicopter tail rotor. My snubber-vibration damper 52 is intended for use in a helicopter main rotor and, therefore, must perform the function of not only carrying heavier loads, but also performing a vibration damping function.

Natural rubber has a loss factor of 0.05, while polybutane has a loss factor of 0.40, and silicone has a loss factor of 0.65. The significance of the polybutane and silicone flat laminates 76 having higher loss factors than the prior art natural rubber laminates is that the higher loss factor laminates produce greater damping as shearing loads are put into the flat elastomer laminates 76 by the lead-lag motion of the blade. The natural rubber laminates were useable in the prior art tail rotor construction of U.S. Pat. No. 4,244,677 because that snubber did not have to perform rotor vibration damping functions.

We claim:

1. A helicopter rotor of the flexbeam rotor variety including:
    (a) a hub member adapted to be mounted for rotation about an axis of rotation;
    (b) a flexible, one-piece spar member of high tensile strength supported by said hub member and extending radially therefrom for rotation about said axis of rotation and having a pitch change axis and a flapping axis, and shaped to be rectangular in cross section and present flat upper and lower surfaces;
    (c) a blade member connected to the radially outer end of said spar member for rotation therewith about said axis of rotation, and pitch change motion therewith about said pitch change axis, and for flapping motion therewith about said flapping axis, and for lead-lag motion;
    (d) a torque tube enveloping said spar member and connected at its outboard end to said spar member and extending inwardly in spaced relation to and enveloping said spar member, and having first and second opposed apertures therein in spaced relation to the flat upper and lower spar member surfaces;
    (e) snubber and vibration damper members positioned at the radially inner end of said torque tube and comprising a top snubber and damper member extending from the spar flat upper surface and extending a selected distance through said first aperture, and a lower snubber and damper member extending from said spar flat lower surface and extending a selected distance through said torque tube second aperture;

(f) means to impart a pitch change control load to said torque tube so as to cause said torque tube to rotate about said pitch change axis and so that said torque tube, by imparting pitch change loads through said snubber and vibration damper members, causes said spar member to flex and said blade to rotate about said pitch change axis; and (g) each of said snubber-vibration damper members comprising:
  (1) a continuous preload outer plate member adapted to selectively preload said snubber and vibration damper members;
  (2) a continuous inner plate member;
  (3) alternate continuous laminates of elastomer and non-extensible material sandwiched between said preload and inner plate members, and with the innermost elastomer laminate bonded to said inner plate member, and the outer most elastomer laminate bonded to said preload plate member, and with intermediate elastomer laminates bonded to the non-extensible material positioned on opposite sides thereof; and
  (4) said laminates of said snubber and vibration damper members being of selected number, size and material so that during assembly, when said preload plate is depressed and connected to said torque tube, said elastomer laminates are preloaded sufficiently to remain in compression under the maximum anticipated pitch change load; and (h) quick connect/disconnect means connecting said inner plate member to one of said spar member flat surfaces.

2. A helicopter rotor according to claim 1 wherein the maximum pitch change load anticipated to be imparted by said pitch change control means to said torque tube and said snubber and vibration damper members is $P_{max}$, wherein the vertical spring rate of the snubber and damper members is K, and wherein the selected distance which each said snubber and vibration damper member extends through said torque tube aperture and is depressed as said preload plate member is connected to said torque tube is $P_{max}/2K$.

3. A helicopter rotor according to claim 2 wherein the alternate continuous laminates of elastomer and non-extensible material of each of said snubber-vibration damper members comprise an inner group of said alternate continuous laminates which are spherical about the intersection pitch change and flapping axis of said spar member and act as a snubber to support said spar member for motion about the axes, and an outer portion of alternate continuous laminates of elastomer and non-extensible material which are flat so as to react lead lag relative motion between the torque tube and the spar member and to damp vibrations therebetween.

4. A helicopter rotor according to claim 3 where each of said laminates is circular in cross section.

5. A helicopter rotor according to claim 4 wherein said flat elastomer laminates are made of a material having a loss factor substantially between 0.4 and 0.65.

6. A helicopter rotor of the flexbeam rotor variety including:

(a) a hub member adapted to be mounted for rotation about an axis of rotation;

(b) a flexible, one-piece spar member of high tensile strength supported by said hub member and extending radially therefrom for rotation about said axis of rotation and having a pitch change axis and a flapping axis, and shaped to be rectangular in cross section and present flat upper and lower surfaces;

(c) a blade member connected to the radially outer end of said spar member for rotation therewith about said axis of rotation, and pitch change motion therewith about said pitch change axis, and for flapping motion therewith about said flapping axis, and for lead-lag motion;

(d) a torque tube enveloping said spar member and connected at its outboard end to said spar member and extending inwardly in spaced relation to and enveloping said spar member, and having first and second opposed apertures therein in spaced relation to the flat upper and lower spar member surfaces;

(e) snubber and vibration damper members positioned at the radially inner end of said torque tube and comprising a top snubber and damper member extending from the spar flat upper surface and extending a selected distance through said first aperture, and a lower snubber and damper member extending from said spar flat lower surface and extending a selected distance through said torque tube second aperture;

(f) means to impart a pitch change control load to said torque tube so as to cause said torque tube to rotate about said pitch change axis and so that said torque tube, by imparting pitch change loads through said snubber and vibration damper members, causes said spar member to flex and said blade to rotate about said pitch change axis; and (g) each of said snubber-vibration damper members comprising:
  (1) a continuous preload outer plate member adapted to selectively preload said snubber and vibration damper member;
  (2) a continuous inner plate member;
  (3) continuous laminates of circular cross-section and alternately made of elastomer and non-extensible material sandwiched between said preload and inner plate members, and with the innermost elastomer laminate bonded to said inner plate member, and the outer most elastomer laminate bonded to said preload plate member, and with intermediate elastomer laminates bonded to the non-extensible material positioned on opposite sides thereof, wherein the alternate continuous laminates of elastomer and non-extensible material of said snubber-vibration damper members comprise an inner group of said alternate continuous laminates which are spherical about the intersection pitch change and flapping axis of said spar member and act as a snubber to support said spar member for motion about the axes, and an outer portion of alternate continuous laminates of elastomer and non-extensible material which are flat so as to react lead lag relative motion between the torque tube and the spar member and to damp vibrations therebetween, and wherein said flat elastomer laminates are made of polybutane and the spherical elastomer laminates are made of natural rubber; and (4) said laminates of said snubber and vibration damper member being of selected number, size and material so that during assembly, when said preload plate is depressed and connected to said torque tube, said elastomer laminates are preloaded sufficiently to remain in compression under the maximum anticipated pitch change load, wherein the maximum pitch change load anticipated to be imparted by said pitch change control means to said torque tube and said snubber and vibration damper member is $P_{max}$, wherein the vertical spring rate of the snubber and damper member is K, and wherein the selected distance which the snubber and vibration damper member extends through said torque tube aperture and is depressed as said preload plate member is connected to said torque tube is $P_{max}/2K$; and (h) quick connect/disconnect means connecting said inner plate member to one of said spar member flat surfaces.

7. A helicopter rotor of the flexbeam rotor variety including:
   (a) a hub member adapted to be mounted for rotation about an axis of rotation;
   (b) a flexible, one-piece spar member of high tensile strength supported by said hub member and extending radially therefrom for rotation about said axis of rotation and having a pitch change axis and a flapping axis, and shaped to be rectangular in cross section and present flat upper and lower surfaces;
   (c) a blade member connected to the radially outer end of said spar member for rotation therewith about said axis of rotation, and pitch change motion therewith about said pitch change axis, and for flapping motion therewith about said flapping axis, and for lead-lag motion;
   (d) a torque tube enveloping said spar member and connected at its outboard end to said spar member and extending inwardly in spaced relation to and enveloping said spar member, and having first and second opposed apertures therein in spaced relation to the flat upper and lower spar member surfaces;
   (e) snubber and vibration damper members positioned at the radially inner end of said torque tube and comprising a top snubber and damper member extending from the spar flat upper surface and extending a selected distance through said first aperture, and a lower snubber and damper member extending from said spar flat lower surface and extending a selected distance through said torque tube second aperture;
   (f) means to impart a pitch change control load to said torque tube so as to cause said torque tube to rotate about said pitch change axis and so that said torque tube, by imparting pitch change loads through said snubber and vibration damper members, causes said spar member to flex and said blade to rotate about said pitch change axis;
   (g) each of said snubber-vibration damper members comprising:
      (1) a continuous preload outer plate members adapted to selectively preload said snubber and vibration damper member;
      (2) a continuous inner plate member;
      (3) continuous laminates of circular cross-section and alternately made of elastomer and non-extensible material sandwiched between said preload and inner plate members, and with the innermost elastomer laminate bonded to said inner plate member, and the outer most elastomer laminate bonded to said preload plate member, and with intermediate elastomer laminates bonded to the non-extensible material positioned on opposite sides thereof, wherein the alternate continuous laminates of elastomer and non-extensible material of said snubber-vibration damper members comprise an inner group of said alternate continuous laminates which are spherical about the intersection pitch change and flapping axis of said spar member and act as a snubber to support said spar member for motion about the axes, and an outer portion of alternate continuous laminates of elastomer and non-extensible material which are flat so as to react lead lag relative motion between the torque tube and the spar member and to damp vibrations therebetween, and wherein said flat elastomer laminates are made of silicone and the spherical elastomer laminates are made of natural rubber; and
      (4) said laminates of said snubber and vibration damper member being of selected number, size and material so that during assembly, when said preload plate is depressed and connected to said torque tube, said elastomer laminates are preloaded sufficiently to remain in compression under the maximum anticipated pitch change load, wherein the maximum pitch change load anticipated to be imparted by said pitch change control means to said torque tube and said snubber and vibration damper member is $P_{max}$, wherein the vertical spring rate of the snubber and damper member is K, and wherein the selected distance which the snubber and vibration damper member extends through said torque tube aperture and is depressed as said preload plate member is connected to said torque tube is $P_{max}/2K$; and
   (h) quick connect/disconnect means connecting said inner plate member to one of said spar member flat surfaces.

8. A helicopter rotor of the flexbeam rotor variety including:
   (a) a hub member adapted to be mounted for rotation about an axis of rotation;
   (b) a flexible, one-piece spar member of high tensile strength supported by said hub member and extending radially therefrom for rotation about said axis of rotation and having a pitch change axis and a flapping axis, and shaped to be rectangular in cross section and present flat upper and lower surfaces;
   (c) a blade member connected to the radially outer end of said spar member for rotation therewith about said axis of rotation, and pitch change motion therewith about said pitch change axis, and for flapping motion therewith about said flapping axis, and for lead-lag motion;
   (d) a torque tube enveloping said spar member and connected at its outboard end to said spar member and extending inwardly in spaced relation to and enveloping said spar member, and having first and second opposed apertures therein in spaced relation to the flat upper and lower spar member surfaces;

(e) snubber and vibration damper members positioned at the radially inner end of said torque tube and comprising a top snubber and damper member extending from the spar flat upper surface and extending a selected distance through said first aperture, and a lower snubber and damper member extending from said spar flat lower surface and extending a selected distance through said torque tube second aperture;

(f) means to impart a pitch change control load to said torque tube so as to cause said torque tube to rotate about said pitch change axis and so that said torque tube, by imparting pitch change loads through said snubber and vibration damper members, causes said spar member to flex and said blade to rotate about said pitch change axis;

(g) each of said snubber-vibration damper members comprising:
  (1) a continuous preload outer plate members adapted to selectively preload said snubber and vibration damper member;
  (2) a continuous inner plate member;
  (3) continuous laminates of circular cross-section and alternately made of elastomer and non-extensible material sandwiched between said preload and inner plate members, and with the innermost elastomer laminate bonded to said inner plate member, and the outer most elastomer laminate bonded to said preload plate member, and with intermediate elastomer laminates bonded to the non-extensible material positioned on opposite sides thereof, wherein the alternate continuous laminates of elastomer and non-extensible material of said snubber-vibration damper members comprise an inner group of said alternate continuous laminates which are spherical about the intersection pitch change and flapping axis of said spar member and act as a snubber to support said spar member for motion about the axes, and an outer portion of alternate continuous laminates of elastomer and non-extensible material which are flat so as to react lead lag relative motion between the torque tube and the spar member and to damp vibrations therebetween, and wherein said flat elastomer laminates are made of a material having a loss factor substantially between 0.4 and 0.65; and
  (4) said laminates of said snubber and vibration damper member being of selected number, size and material so that during assembly, when said preload plate is depressed and connected to said torque tube, said elastomer laminates are preloaded sufficiently to remain in compression under the maximum anticipated pitch change load, wherein the maximum pitch change load anticipated to be imparted by said pitch change control means to said torque tube and said snubber and vibration damper member is $P_{max}$, wherein the vertical spring rate of the snubber and damper member is K, and wherein the selected distance which the snubber and vibration damper member extends through said torque tube aperture and is depressed as said preload plate member is connected to said torque tube is $P_{max}/2K$; and (h) quick connect/disconnect means connecting said inner plate member to one of said spar member flat surfaces; and wherein each of said quick connect/disconnect means comprise:

(a) a retainer member having:
  (1) a flat portion engaging one of said spar member flat surface;
  (2) spaced channel flanges extending in parallel relationship on opposite sides of said flat portion and spaced therefrom so as to form parallel, spaced channels therebetween; and
  (3) a cylindrical aperture in said flat portion;

(b) composite wrap members enveloping said spar member in spaced relationship and engaging said retainer member to retain said retainer member against said spar flat surface; and (c) wherein each of said inner plate members of said snubber vibration damper members has:
  (1) a flat portion;
  (2) a spherical portion extending from said flat portion on one side thereof and shaped to matingly engage and be bonded to the innermost elastomer laminate of the snubber and vibration damper member;
  (3) a cylindrical knob projecting therefrom in a direction opposite to the spherical portion;
  (4) spaced, flat side surfaces; and
  (5) circular end surfaces with greater spacing therebetween than said flat surfaces so that when connecting said snubber and vibration damper member to said spar member, the snubber and vibration damper inner plate member is passed through the aperture of the torque tube in an orientation wherein the flat side surfaces of the inner plate member are positioned in alignment with said retainer member spaced channels to bring the cylindrical knob of the inner plate member into retaining engagement with the cylindrical aperture of the retainer member, so that the snubber and vibration damper member may then be rotated 90 degrees to bring the circular end surfaces of the inner plate member into locking engagement with said retaining member spaced channels so as to connect said snubber and vibration-damper member to said flexible spar member in quick connect/disconnect fashion.

* * * * *